United States Patent
Valentini et al.

(10) Patent No.: US 7,176,248 B2
(45) Date of Patent: Feb. 13, 2007

(54) SMEAR RESISTANT INKJET INKS

(75) Inventors: Jose E. Valentini, West Chester, PA (US); Kathryn Amy Pearlstine, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 5 days.

(21) Appl. No.: 10/346,041

(22) Filed: Jan. 16, 2003

(65) Prior Publication Data

US 2003/0184629 A1 Oct. 2, 2003

Related U.S. Application Data

(60) Provisional application No. 60/349,056, filed on Jan. 16, 2002.

(51) Int. Cl.
- C09D 11/10 (2006.01)
- C08L 75/04 (2006.01)
- C08G 18/10 (2006.01)

(52) U.S. Cl. .......................... 523/160; 524/590; 524/840

(58) Field of Classification Search ................. 523/160, 523/161; 524/495, 590, 801, 839, 840; 106/31.6
See application file for complete search history.

(56) References Cited

U.S. PATENT DOCUMENTS

| | | | |
|---|---|---|---|
| 2,439,442 A | 4/1948 | Amon et al. | |
| 3,279,935 A | 10/1966 | Daniell et al. | |
| 3,347,632 A | 10/1967 | Parker | |
| 5,328,504 A | 7/1994 | Ohnishi | |
| 5,554,739 A | 9/1996 | Belmont | |
| 5,571,311 A | 11/1996 | Belmont et al. | |
| 5,609,671 A | 3/1997 | Nagasawa | |
| 5,672,198 A | 9/1997 | Belmont | |
| 5,698,016 A | 12/1997 | Adams et al. | |
| 5,707,432 A | 1/1998 | Adams et al. | |
| 5,718,746 A | 2/1998 | Nagasawa et al. | |
| 5,747,562 A | 5/1998 | Mahmud et al. | |
| 5,749,950 A | 5/1998 | Mahmud et al. | |
| 5,750,592 A * | 5/1998 | Shinozuka et al. | 523/161 |
| 5,803,959 A | 9/1998 | Johnson et al. | |
| 5,837,045 A | 11/1998 | Johnson et al. | |
| 5,846,307 A | 12/1998 | Nagasawa et al. | |
| 5,851,280 A | 12/1998 | Belmont et al. | |
| 5,861,447 A * | 1/1999 | Nagasawa et al. | 523/161 |
| 5,885,335 A | 3/1999 | Adams et al. | |
| 5,895,522 A | 4/1999 | Belmont et al. | |
| 5,922,118 A | 7/1999 | Johnson et al. | |
| 5,928,419 A | 7/1999 | Uemura et al. | |
| 5,976,233 A | 11/1999 | Osumi et al. | |
| 6,057,384 A | 5/2000 | Nguyen et al. | |
| 6,099,632 A | 8/2000 | Nagasawa et al. | |
| 6,123,759 A | 9/2000 | Mise et al. | |
| 6,153,001 A | 11/2000 | Suzuki et al. | |
| 6,204,307 B1 * | 3/2001 | Miyabayashi | 523/160 |
| 6,221,141 B1 | 4/2001 | Takada et al. | |
| 6,221,142 B1 | 4/2001 | Wang et al. | |
| 6,221,143 B1 | 4/2001 | Palumbo | |
| 6,281,267 B2 | 8/2001 | Parazak | |
| 6,329,446 B1 | 12/2001 | Sacripante et al. | |
| 6,368,397 B1 * | 4/2002 | Ichizawa et al. | 106/31.65 |
| 6,379,443 B1 * | 4/2002 | Komatsu et al. | 106/31.58 |
| 6,511,534 B1 * | 1/2003 | Mishina et al. | 106/31.33 |
| 6,794,425 B1 * | 9/2004 | Ellis et al. | 523/160 |
| H002113 H * | 1/2005 | Nichols et al. | 523/160 |
| 2001/0003511 A1 | 11/2001 | Kato | |
| 2002/0107303 A1 * | 8/2002 | Miyabashi et al. | 523/160 |
| 2003/0037699 A1 * | 2/2003 | Yatake | 106/31.58 |
| 2003/0166742 A1 * | 9/2003 | Hirasa et al. | 523/160 |
| 2004/0110867 A1 * | 6/2004 | McCovick | 523/160 |

FOREIGN PATENT DOCUMENTS

| | | | |
|---|---|---|---|
| EP | 0 616 017 A2 | | 9/1994 |
| EP | 0 859 037 A1 | | 8/1998 |
| EP | 1 148 103 A1 | | 10/2001 |
| EP | 1148103 A1 | * | 10/2001 |
| EP | 1 114 851 A1 | | 11/2001 |
| EP | 1 158 030 A2 | | 11/2001 |
| EP | 1 270 253 A2 | | 2/2003 |
| WO | WO 01/10963 A1 | | 2/2001 |
| WO | WO 01/25340 A1 | | 4/2001 |
| WO | WO 01/48101 A1 | * | 7/2001 |
| WO | WO 01/94476 A2 | | 12/2001 |

OTHER PUBLICATIONS

PCT International Search Report (PCT/US03/01480) dated May 6, 2003.

\* cited by examiner

*Primary Examiner*—Callie Shosho

(57) ABSTRACT

This invention pertains to inkjet inks, in particular to smear resistant inkjet inks, and even more particularly to smear resistant pigmented aqueous inkjet inks comprising polyurethane dispersion binders and self-dispersing pigments.

31 Claims, No Drawings

SMEAR RESISTANT INKJET INKS

CROSS-REFERENCE TO RELATED APPLICATION

This application claims priority under 35 U.S.C. §119 from U.S. Provisional Application Ser. No. 60/349,056 (filed Jan. 16, 2002), which is incorporated by reference herein as if fully set forth.

BACKGROUND OF THE INVENTION

This invention pertains to inkjet inks, in particular to smear resistant inkjet inks, and even more particularly to smear resistant pigmented inkjet inks containing polyurethane dispersions.

Inkjet recording is a printing method wherein droplets of ink are ejected through fine nozzles to form letters or figures on the surface of recording media. Inks used in such recording are subject to rigorous demands including, for example, good dispersion stability, ejection stability, and good fixation to media.

Both dyes and pigments have been used as colorants for inkjet inks. While dyes typically offer superior color properties compared to pigments, they tend to be fade quickly and are more prone to rub off. Inks comprising pigments dispersed in aqueous media are advantageously superior to inks using water-soluble dyes in water-fastness and light-fastness of printed images.

Pigments suitable for aqueous inkjet inks are in general well-known in the art. Traditionally, pigments were stabilized by dispersing agents, such as polymeric dispersants or surfactants, to produce a stable dispersion of the pigment in the vehicle. More recently though, so-called "self-dispersible" or "self-dispersing" pigments (hereafter "SDP") have been developed. As the name would imply, SDPs are dispersible in water without dispersants.

SDPs are often advantageous over traditional dispersant stabilized pigments from the standpoint of greater stability and lower viscosity at the same pigment loading. This can provide greater formulation latitude in final ink.

SDPs, and particularly self-dispersing carbon black pigments, are disclosed in, for example, U.S. Pat. No. 2,439,442, U.S. Pat. No. 3,023,118, U.S. Pat. No. 3,279,935 and U.S. Pat. No. 3,347,632. Additional disclosures of SDPs, methods of making SDPs and/or aqueous ink jet inks formulated with SDP's can be found in, for example, U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No. 6,153,001, U.S. Pat. No. 6,221,141, U.S. Pat. No. 6,221,142, U.S. Pat. No. 6,221,143, U.S. Pat. No. 6,281,267, U.S. Pat. No. 6,329,446, US2001/0035110, EP-A-1114851, EP-A-1158030, WO01/10963, WO01/25340 and WO01/94476.

All of the above disclosures are incorporated by reference herein for all purposes as if fully set forth.

When printing on porous media such as paper, penetrating agents are often added to shorten the drying time of printed images and, in addition, to form large pixels using a small amount of ink.

Although advantageous in some regards, penetrating pigment-based ink compositions can cause the color development to be somewhat poor when ink is printed on plain paper. Increasing the content of the pigment can improve color development but it generally also increases the viscosity of ink and thus is often unfavorable for the ejection stability of ink. However, the beneficial properties of SDPs allow these pigments to be loaded to higher levels with less impact on viscosity. Thus a penetrating ink having excellent color development is still possible by using SDPs.

Despite these potential advantages to the use of SDPs, inks formulated with SDPs tend to be somewhat poor in fixation on recording media, in particular plain paper.

Water resistance (fastness) is one type of fixation. As used herein, "water resistance" refers to the resistance of a print to blurring when contacted with drops of water. A printed page should not become blurred or illegible if wetted.

Smear resistance (fastness) is another type fixation. As used herein, "smear resistance" refers to the resistance of a print to blurring when stroked with a highlighter marker.

A printed page, especially text, should not become blurred or illegible if subjected to a highlighter. Smear resistance has been particularly difficult to achieve with an inkjet ink. An ink that is water-fast is not necessarily smear-fast.

Previously incorporated EP-A-1114851 demonstrates (Comparative Example 2 in Table 3) the problem of poor smear resistance in an SDP inkjet ink (therein referred to as rubbing/scratching resistance). There is taught the combination of SDP and dispersant stabilized pigment to improve image properties.

Previously incorporated EP-A-1158030 likewise demonstrates (Example 9 in Table 1) the problem of poor smear resistance with SDP inkjet ink (therein is referred to as high-lighter resistance).

Previously incorporated U.S. Pat. No. 6,329,446 discloses an inkjet ink with SDP and an acrylic emulsion for improved optical density and smear resistance.

Previously incorporated U.S. Pat. No. 6,057,384 discloses an inkjet ink with SDP and a core/shell acrylic latex to provide smear-fast prints.

Still, there is need for dispersion stable, ejection stable inkjet inks comprising an SDP which can print with good color on plain paper and which are water- and smear-fast.

SUMMARY OF THE INVENTION

The present invention provides inks possessing good smear-fastness, water-fastness and high optical density (OD), while also providing good stability and jetting characteristics.

In accordance with one aspect of the present invention, there is provided an aqueous inkjet ink comprising an SDP, a polyurethane dispersion and water.

In accordance with another aspect of the present invention, there is provided an improved aqueous inkjet ink, the aqueous inkjet ink comprising an SDP dispersed in an aqeous medium, wherein the improvement comprises that said aqueous inkjet ink further comprises a polyurethane dispersion.

In accordance with yet another aspect of the present invention, there is provided a process for inkjet printing utilizing the aforementioned aqueous ink jet ink.

The inks of the instant invention are particularly advantageous for printing on plain paper.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention which are, for brevity, described in the context of a single embodiment, may also be provided separately or in any subcombination.

DETAILED DESCRIPTION OF THE PREFERRED EMBODIMENTS

Self-Dispersible Pigments (SDPs)

As indicated previously, SDPs are in a general sense well-known to those of ordinary skill in the art, as exemplified by the numerous incorporated references listed above.

Typically, SDPs are pigments that have been surface treated to render them self-dispersible in water such that no separate dispersant is needed. The pigments may be black, such as carbon black, or may be colored pigments such as PB 15:3 and 15:4 cyan, PR 122 and 123 magenta, and PY 128 and 74 yellow.

Preferably, the pigment is treated on its surface so as to bond at least one functional group selected from the group consisting of carbonyl, carboxyl, hydroxyl and sulfone groups, or a salt thereof, onto the surface of the pigment. More specifically, this surface-treated pigment may be prepared by grafting a functional group or a molecule containing a functional group onto the surface of the pigment or by physical treatment (such as vacuum plasma), or chemical treatment (for example, oxidation with hypochlorous acid, sulfonic acid or the like). A single type or a plurality of types of functional groups may be grafted on one pigment particle. The type and the degree of grafting of the functional group(s) may be properly determined by taking into consideration, for example, dispersion stability in ink, color density, and drying properties at the front end of an ink jet head.

Preferred pigments usable in the present invention may be produced, for example, by an oxidation with ozone method described in previously incorporated WO01/94476. Carbon black treated by the method described in this publication has a high surface-active hydrogen content which is neutralized with base to provide very stable dispersions in water. Application of this method to colored pigments is also possible.

Commercially available SDP products may also be used. Preferred examples thereof include Microjet CW 1 manufactured by Orient Chemical Industries, Ltd., and Cab-O-Jet 200 and 300 manufactured by Cabot Corporation.

A wide variety of organic and inorganic pigments, alone or in combination, are known in the art as suitable for inkjet. As with any pigmented inkjet ink, care must be taken to ensure that the pigment particles are small enough to avoid clogging or plugging the orifice of the nozzles that will be used to fire the ink. Small pigment particles also have an influence on the stability of the pigment dispersion, which is critical throughout the life of the ink.

Useful particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Polyurethane Dispersions (PUDs)

In accordance with the present invention the term "polyurethane dispersion" refers to aqueous dispersions of polymers containing urethane groups and optionally urea groups, as that term is understood by those of ordinary skill in the art. These polymers also incorporate hydrophilic functionality to the extent required to maintain a stable dispersion of the polymer in water.

Preferred polyurethane dispersions are those in which the polymer is predominantly stabilized in the dispersion through incorporated ionic functionality, and particularly anionic functionality such as neutralized acid groups ("anionically stabilized polyurethane dispersion"). Further details are provided below.

Such aqueous polyurethane dispersions are typically prepared by a multi-step process in which an isocyanate (N=C=O, NCO) prepolymer is initially formed and subsequently chain extended in the aqueous phase optionally in the presence of a polyfunctional group chain extender. Also, the NCO prepolymer is typically formed by a multi-step process.

Typically, in the first stage of prepolymer formation, a diisocyanate is reacted with a compound containing one or more isocyanate-reactive groups and at least one acid or acid salt group to form an intermediate product. The molar ratio of diisocyanate to compounds containing isocyanate-reactive groups is such that the equivalents of isocyanate functionality is greater than the equivalents of isocyanate-reactive functionality, resulting in an intermediate product terminated by at least one NCO group. Thus, the molar ratio of diisocyanate to compounds containing one isocyanate-reactive group is at least about 1:1, preferably about 1:1 to about 2:1, more preferably about 1:1 to about 1.5:1 and most preferably about 1:1. The molar ratio of diisocyanate to compounds containing two isocyanate-reactive groups is at least about 1:5:1, preferably about 1.5:1 to about 3:1, more preferably about 1.8:1 to about 2.5:1, and most preferably about 2:1. Ratios for mixtures of compounds containing one and two isocyanate-reactive groups can readily be determined depending on the ratio of the two.

In general, the various ratios ensure that at least one of the isocyanate-reactive groups of the compounds containing acid groups are reacted with isocyanate groups, preferably most of the isocyanate-reactive groups are reacted with isocyanate groups from the diisocyanate.

After the preparation of the previously described intermediate product, the remaining components are reacted with the intermediate product to form the NCO prepolymer. These other components include a high molecular weight polyol, optionally an isocyanate-reactive compound containing non-ionic hydrophilic groups, optionally a low molecular weight, isocyanate-reactive chain extender, and optionally an isocyanate-reactive compound containing non-ionic groups which can self condense to form a crosslink. These components are reacted in amounts sufficient to provide a molar ratio such that the overall equivalent ratio of isocyanate groups to isocyanate-reactive groups is about 1.1:1 to about 2:1, preferably about 1.2:1 to about 1.8:1, and more preferably about 1.2:1 to about 1.5:1.

Suitable diisocyanates for reacting with the isocyanate-reactive compound containing ionic groups (or groups which can be rendered ionic via, for example, neutralization) are those which contain either aromatic, cycloaliphatic or aliphatic-bound isocyanate groups. The preferred isocyanate is bound to a cycloaliphatic or aliphatic group.

Examples of suitable diisocyanates include cyclohexane-1,3- and -1,4-diisocyanate; 1-isocyanato-3-isocyanatomethyl-3,5,5-trimethyl-cyclohexane (isophorone diisocyanate or IPDI); bis-(4-isocyanatocyclohexyl)-methane; 1,3- and 1,4-bis-(isocyanatomethyl)-cyclohexane; 1-isocyanato-2-isocyanatomethyl cyclopentane; bis-(4-isocyanatocyclohexyl)-methane; 2,4'-diisocyanato-dicyclohexyl methane; bis-(4-isocyanato-3-methyl-cyclohexyl)-methane, alpha,alpha,alpha',alpha'-tetramethyl-1,3- and/or -1,4-xylylene diisocyanate; 1-isocyanato-1-methyl-4(3)-isocyanatomethyl cyclohexane; and 2,4- and/or 2,6-hexahydrotoluylene diisocyanate.

Additional diisocyanates may be linear or branched and contain 4 to 12 carbon atoms, preferably 4 to 8 carbon atoms and more preferably 6 carbon atoms, which include 1,4-tetramethylene diisocyanate; 1,6-hexamethylene diisocyanate; 2,2,4-trimethyl-1,6-hexamethylene diisocyanate; and 1,12-dodecamethylene diisocyanate. 1,6-hexamethylene diisocyanate is especially preferred. Also preferred is isophorone diisocyanate.

Isocyanate-reactive compounds containing acid groups, i.e., carboxylic acid groups, carboxylate groups, sulphonic acid groups, sulphonate groups, phosphoric acid groups and phosphonate groups, are chemically incorporated into the polyurethane to provide hydrophilicity and enable the polyurethane to be stably dispersed in an aqueous medium. The acid salts are formed by neutralizing the corresponding acid groups either prior to, during or after formation of the NCO prepolymer, preferably after formation of the NCO prepolymer. Isocyanate-reactive compounds containing carboxylic acids or carboxylic acid salts are preferred.

Suitable compounds for incorporating carboxyl groups are described in U.S. Pat. No. 3,479,310, U.S. Pat. No. 4,108,814 and U.S. Pat. No. 4,408,008, which are incorporated by reference herein for all purposes as if fully set forth. The neutralizing agents for converting the carboxylic acid groups to carboxylate salt groups are described in the preceding U.S. patents and are also discussed hereinafter. Within the context of this invention, the term "neutralizing agents" is meant to embrace all types of agents which are useful for converting carboxylic acid groups to hydrophilic carboxylate salt groups.

Preferred carboxylic group-containing compounds are the hydroxy-carboxylic acids corresponding to the formula $(HO)_xQ(COOH)_y$ wherein Q represents a straight or branched, hydrocarbon radical containing 1 to 12 carbon atoms, x is 1 or 2, preferably 2 and y is 1 to 3, preferably 1 or 2 and more preferably 1.

Examples of these hydroxy-carboxylic acids include citric acid, tartaric acid and hydroxypivalic acid.

Especially preferred acids are those of the above-mentioned formula wherein x=2 and y=1. These dihydroxy alkanoic acids are described in U.S. Pat. No. 3,412,054, which is incorporated by reference herein for all purposes as if fully set forth. Especially preferred dihydroxy alkanoic acids are the alpha, alpha-dimethylol alkanoic acids represented by the structural formula:

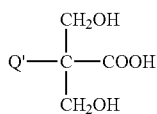

wherein Q' is hydrogen or an alkyl group containing 1 to 8 carbon atoms. The most preferred compound is alpha, alpha-dimethylol propionic acid (DMPA), i.e., wherein Q' is methyl in the above formula.

The acid groups are incorporated in an amount sufficient to provide an ionic group content of at least about 10, preferably at least about 18 milligrams of KOH/gram of polyurethane resin solids The upper limit for the content of acid groups is about 100, preferably about 60, and more preferably about 40 milligrams per 1 g of polyurethane resins solids. This ionic group content is equivalent to an acid number for the polyurethane resin solids.

After reaction of the diisocyanates with the isocyanate-reactive compounds containing acid groups, the resulting intermediate product is reacted with a high molecular weight polyol to prepare the, prepolymer.

Suitable higher molecular weight polyols containing at least two hydroxy groups, which may be reacted with the preadducts to prepare the NCO prepolymers, are those having a molecular weight of about 400 to about 6000, preferably about 800 to about 3000, and more preferably about 1000 to about 2500. The molecular weights are number average molecular weights (Mn) and are determined by end group analysis (OH number, hydroxyl analysis). Examples of these high molecular weight compounds include polyester polyols, polyether polyols, polyhydroxy polycarbonates, polyhydroxy polyacetals, polyhydroxy polyacrylates, polyhydroxy polyester amides and polyhydroxy polythioethers. A combination of the polyols can also be used in the polyurethane. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, for example, by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g., enthylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethyl-cyclohexane); 2-methyl-1,3-propanediol; 2,2,4-trimethyl-1,3-pentanediol; triethylene glycol; tetra-ethylene glycol; polyethylene glycol; dipropylene glycol; polypropylene glycol; dibutylene glycol and polybutylene glycol,glycerine and trimethylol-propane. The polyesters may also contain a portion of carboxyl end groups. Polyesters of lactones, for example, epsilon-caprolactone, or hydroxycarboxylic acids, for example, omega-hydroxycaproic acid, may also be used.

Polycarbonates containing hydroxyl groups include those known, per se, such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol,1,2,4-butane triol,trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl) ethane.

Polyethers which have been obtained by the reaction of starting compounds containing amine compounds can also be used, but are less preferred for use in the present invention. Examples of these polyethers as well as suitable polyhydroxy polyacetals, polyhydroxy polyacrylates, polyhydroxy polyester amides, polyhydroxy polyamides and polyhydroxy polythioethers are disclosed in U.S. Pat. No. 4,701,480, which is incorporated by reference herein for all purposes as if fully set forth.

Poly(meth)acrylates containing hydroxyl groups include those common in the art of addition polymerization such as cationic, anionic and radical, polymerization and the like. Preferred are alpha-omega diols. An example of these type of diols are those which are prepared by a "living" or "control" or chain transfer polymerization processes which enables the placement of one hydroxyl group at or near the termini of the polymer. U.S. Pat. No. 6,248,839 and U.S. Pat. No. 5,990,245 (both incorporated by reference herein for all purposes as if fully set forth) have examples of protocol for making terminal diols.

The high molecular weight polyols are generally present in the polyurethanes in an amount of at least about 5%, preferably at least about 10% by weight, based on the weight of the polyurethane. The maximum amount of these polyols is generally about 85%, and preferably about 75% by weight, based on the weight of the polyurethane.

Other optional compounds for preparing the NCO prepolymer include low molecular weight, at least difunctional isocyanate-reactive compounds having an average molecular weight of up to about 400. Examples include the dihydric and higher functionality alcohols, which have previously been described for the preparation of the polyester polyols and polyether polyols.

In addition to the above-mentioned components which are preferably difunctional in the isocyanate polyaddition reaction, mono-functional and even small portions of trifunctional and higher functional components generally known in polyurethane chemistry, such as trimethylolpropane or 4-isocyanantomethyl-1,8-octamethylene diisocyanate, may be used in special cases in which slight branching of the NCO prepolymer or polyurethane is desired. However, the NCO prepolymers should be substantially linear and this may be achieved by maintaining the average functionality of the prepolymer starting components at or below 2:1.

Other optional compounds include isocyanate-reactive compounds containing lateral or terminal, hydrophilic ethylene oxide units. The content of hydrophilic ethylene oxide units (when present) may be up to about 10%, preferably up to about 8%, more preferably about 1 to about 6% and most preferably about 2 to about 6%, by weight, based on the weight of the polyurethane. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

The isocyanate-reactive compounds for incorporating lateral or terminal, hydrophilic ethylene oxide units may contain either one or two isocyanate-reactive groups, preferably hydroxy groups. Examples of these compounds are disclosed in U.S. Pat. No. 3,905,929, U.S. Pat. No. 3,920,598 and U.S. Pat. No. 4,190,566, which are incorporated by reference herein for all purposes as if fully set forth. Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, such as propylene oxide.

Other optional compounds include isocyanate-reactive compounds containing self-condensing moieties. The content of these compounds are dependent upon the desired level of self-condensation necessary to provide the desirable resin properties. 3-amino-1-triethoxysilyl-propane is an examples on a compound that will react with isocyanates through the amino group and yet self-condense through the silyl group when inverted into water.

Non-condensable silanes with isocyanate reactive groups can be used in place of or in conjunction with the include isocyanate-reactive compounds containing self-condensing moieties. U.S. Pat. No. 5,760,123 and U.S. Pat. No. 6,046,295 (both incorporated by reference herein for all purposes as if fully set forth) are exemplary methods for use of these optional silane containing compounds.

Process conditions for preparing the NCO prepolymers have been discussed in the patents previously incorporated by reference. The finished NCO prepolymer should have a free isocyanate content of about 1 to about 20%, preferably about 1 to about 10% by weight, based on the weight of prepolymer solids.

The polyurethanes are typical prepared by chain extending these NCO prepolymers. Preferred chain extenders are polyamine chain extenders, which can optionally be partially or wholly blocked as disclosed in U.S. Pat. No. 4,269,748 and U.S. Pat. No. 4,829,122, which are herein incorporated by reference herein for all purposes as if fully set forth. These patents disclose the preparation of aqueous polyurethane dispersions by mixing NCO prepolymers with at least partially blocked, diamine or hydrazine chain extenders in the absence of water and then adding the mixture to water. Upon contact with water the blocking agent is released and the resulting unblocked polyamine reacts with the NCO prepolymer to form the polyurethane.

Suitable blocked amines and hydrazines include the reaction products of polyamines with ketones and aldehydes to form ketimines and aldimines, and the reaction of hydrazine with ketones and aldehydes to form ketazines, aldazines, ketone hydrazones and aldehyde hydrazones. The at least partially blocked polyamines contain at most one primary or secondary amino group and at least one blocked primary or secondary amino group which releases a free primary or secondary amino group in the presence of water.

Suitable polyamines for preparing the at least partially blocked polyamines have an average functionality, i.e., the number of amine nitrogens per molecule, of 2 to 6, preferably 2 to 4 and more preferably 2 to 3. The desired functionalities can be obtained by using mixtures of polyamines containing primary or secondary amino groups. The polyamines are generally aromatic, aliphatic or alicyclic amines and contain from 1 to 30, preferably 2 to 15 and more preferably 2 to 10 carbon atoms. These polyamines may contain additional substituents provided that they are not as reactive with isocyanate groups as the primary or secondary amines. These same polyamines can be partially or wholly blocked polyamines.

Preferred polyamines include 1-amino-3-aminomethyl-3,5,5-trimethylcyclohexane (isophorone diamine or IPDA), bis-(4-amino-cyclohexyl)-methane, bis-(4-amino-3-methyl-cyclohexyl)-methane, 1,6-diaminohexane, ethylene diamine, diethylene triamine, triethylene tetramine, tetraethylene pentamine and pentaethylene hexamine. Hydrazine is also preferred.

The amount of chain extender to be used in accordance with the present invention is dependent upon the number of terminal isocyanate groups in the prepolymer. Preferably, the ratio of terminal isocyanate groups of the prepolymer to isocyanate-reactive groups of the chain extender is between about 1.0:0.6 and about 1.0:1.1, more preferably between about 1.0:0.8 and about 1.0:0.98, on an equivalent basis.

Any isocyanate groups that are not chain extended with an amine will react with water, which functions as a diamine chain extender.

Chain extension can take place prior to addition of water in the process, but typically takes place by combining the NCO prepolymer, chain extender, water and other optional components under agitation.

Polyurethanes can be characterized by a variety of techniques. One technique is thermogravimetric analyses. This method characterizes thermal transitions of the polyurethanes. The initial $T_g$ is a characteristic feature of a polyurethane. As reported in *Ullman's Encylcopedia of Chemical Technoloqy* (Wiley Interscience, 1985, New York) typical $T_g$ for common polyurethanes are poly(ethylene adipate)-25° C., poly(butene-1,4-adipate) -40° C.; poly (hexanediol-1-6 carbonate) -30° C. The preferred polyurethanes for the instant invention have $T_g$ of less than about -30° C. Standard thermalgravimetric techniques are used to determine these glass transition temperatures.

Molecular weight is also a characteristic of the polyurethane that can be used to define a polyurethane. The molecular weight is routinely reported as weight average molecular weight, Mw. The preferred molecular weight is more than 30,000 as Mw. The polyurethane binders are not limited to Gaussian distribution of molecular weight, but may have other distributions such as bimodal distributions.

Suitable polyurethane binders, when mixed with water or in the aqueous solution that the polyurethane was prepared, will form a dispersion. The particle size of the polyurethane binders is typically in the range of about 30 to about 100,000 nm. The preferred range for polyurethane binders for inkjet inks is from about 30 to about 350 nm.

Other monomers and/or oligomers that will not participate chemically in the polyurethane synthesis steps can be added. The addition can be anywhere in the synthetic cycle as long as there is no interference in the polyurethane synthesis. A specific example of a compatible oligomer/monomer is a styrene allyl alcohol, abbreviated SM.

In order to have a stable dispersion, a sufficient amount of the acid groups must be neutralized so that, when combined with the optional hydrophilic ethylene oxide units and optional external emulsifiers, the resulting polyurethane will remain stably dispersed in the aqueous medium. Generally, at least about 75%, preferably at least about 90%, of the acid groups are neutralized to the corresponding carboxylate salt groups.

Suitable neutralizing agents for converting the acid groups to salt groups either before, during or after their incorporation into the NCO prepolymers, include tertiary amines, alkali metal cations and ammonia. Examples of these neutralizing agents are disclosed in U.S. Pat. No. 4,501,852 and U.S. Pat. No. 4,701,480, both of which are incorporated by reference herein for all purposes as if fully set forth. Preferred neutralizing agents are the trialkyl-substituted tertiary amines, such as triethyl amine, tripropyl amine, dimethylcyclohexyl amine, and dimethylethyl amine.

Neutralization may take place at any point in the process. A typical procedure includes at least some neutralization of the prepolymer, which is then chain extended in water in the presence of additional neutralizing agent.

Further details about the preparation of polyurethane dispersions can be found from the previously incorporated references.

The final product is a stable aqueous dispersion of polyurethane particles having a solids content of up to about 60% by weight, preferably about 15 to about 60% by weight and most preferably about 30 to about 45% by weight. However, it is always possible to dilute the dispersions to any minimum solids content desired.

Suitable polyurethane aqueous dispersions are commercially available from numerous commercial sources, for example, under the trade names Bayhydrol® from Bayer AG, Hybridur® from Air Products and Chemicals, Cydrothane® from Cytec Industries, Inc., Macekote from Mace Adhesives and Coatings Co., Inc, and Sancure® from B. F. Goodrich Co.

Proportion of Main Ingredients

The pigment levels employed in the instant inks are those levels which are typically needed to impart the desired color density to the printed image. Typically, pigment levels are in the range of about 0.01 to about 10% by weight of the ink.

The polyurethane level employed is dictated by the degree of fixation sought and the range of ink properties which can be tolerated. Typically, polyurethane levels will range up to about 10%, more preferably from about 0.1 to about 10%, more typically about 0.2 to about 4%, by weight (polyurethane solids basis) of ink. Often, some degree of improved ink fixation can be gained even at very low levels of polyurethane. Better fixation is obtained at higher levels, but generally, at some point, viscosity is increased excessively and jetting performance becomes unacceptable. The right balance of properties must be determined for each circumstance, which determination can generally be made by routine experimentation well within the skill of those of ordinary skill in the art.

Combinations of two or more polyurethane dispersions may also be utilized. Polyurethanes dispersions may be used in combination with other binders, such as polyacrylate/polymethacrylates.

Other Ingredients

The inkjet ink may contain other ingredients as are well known in the art. For example, anionic, nonionic, cationic or amphoteric surfactants may be used. In aqueous inks, the surfactants are typically present in the amount of about 0.01 to about 5%, and preferably about 0.2 to about 2%, based on the total weight of the ink.

Co-solvents, such as those exemplified in U.S. Pat. No. 5,272,201 (incorporated by reference herein for all purposes as if fully set forth) may be included to improve pluggage inhibition properties of the ink composition. This "pluggage" is characterized by observing plugged nozzles, which results in poor print quality.

Biocides may be used to inhibit growth of microorganisms.

Sequestering agents such as EDTA may also be included to eliminate deleterious effects of heavy metal impurities.

Other known additives may also be added to improve various properties of the ink compositions as desired. For example, penetrating agents such as glycol ethers and 1,2-alkanediols may be added to the formulation.

Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

1,2-Alkanediols are preferably 1,2-C1–6 alkanediols, most preferably 1,2-hexanediol.

The amount of glycol ether(s) and 1,2-alkanediol(s) added must be properly determined, but is typically in the range of from about 1 to about 15% by weight and more typically about 2 to about 10% by weight, based on the total weight of the ink.

Ink Properties

Jet velocity, separation length of the droplets, drop size and stream stability are greatly affected by the surface tension and the viscosity of the ink. Pigmented inkjet inks suitable for use with ink jet printing systems should have a surface tension in the range of about 20 mN/m (dynes/cm) to about 70 mN/m (dynes/cm), more preferably about 25 to about 40 mN/m (dynes/cm) at 25° C. Viscosity is preferably in the range of about 1 mPa·s (cP) to about 30 mPa·s (cP), more preferably about 2 to about 20 mPa·s (cP) at 25° C. The ink has physical properties compatible with a wide range of ejecting conditions, i.e., driving frequency of the pen and the shape and size of the nozzle. The inks should have excellent storage stability for long periods. Further, the ink should not corrode parts of the inkjet printing device it comes in contact with, and it should be essentially odorless and non-toxic. Preferred inkjet printheads include (but are not limited to) those with piezo and thermal droplet generators.

Evaluation

A black SDP can be prepared, for example, by any one of Inventive Examples 1–25 in previously incorporated reference WO 01/94476. Thus, a black pigment is processed into a SDP. In the examples the black pigment is noted which was processed into a SDP prior to preparing the ink. Likewise a magenta SDP (Example 26) can be prepared, for example, according to examples 12 or 13 in WO 01/94476.

A suitable polyurethane dispersion can be, for example, Mace 85-302-1 with 36% weight percent polyurethane solids (Mace Adhesives & Coatings Co., Inc, Dudley, Mass., USA).

An ink can be made, for example, using the formulation of Comparative Examples A–H in previously incorporated EP-A-1114851 as a basis. Thus, an inventive black ink can comprise (in weight percent), 6.5% black SDP, 2% Mace 85-302-1 polyurethane dispersion, 13% glycerin, 2% 2-pyrrolidone, 7% triethylene glycol monobutyl ether, 1% acetylene glycol surfactant, 0.3% biocide and the balance water. The pigment content in the inventive example is actually reduced relative to the art example to allow for addition of the polyurethane dispersion without exceeding the viscosity range of the inkjet pen used for testing. A magenta ink can be made in the same way using instead 5% magenta SDP and 3% Mace 85-302-1 polyurethane dispersion. The inks are filtered and degassed before printing.

The inks can be evaluated by printing onto plain paper such as Hammermill Copy Plus and Xerox 4024 with an inkjet printer such as an Epson Stylus Color 980 with print driver set for: 720 dpi; no color adjustment; finest detail; high speed.

Optical density and color (LabCh) measurements are made using a Greytag spectro-densiometer set to "status I" (narrow band) and "absolute" for the optical density measurements.

To determine smear, a pattern consisting of five 4 mm-wide parallel stripes spaced about 7 mm apart is printed using 720 dpi. Two strokes from a highlighter, one on top of the other, are drawn across the five printed lines. Suitable highlighter pens are available, for example, under the trademarks Hi-Liter® from Avery Dennison Corp., Zebra® Pen from Zebra Pen Corp, Pilot from the Pilot Pen Company, highlighters from Sanford Company and Ecowriter from Misubishi Pencil Company. This process is carried out on different parts of the test pattern at various time intervals, for example, at 10 sec, 10 minutes and one hour after printing the test pattern. The stripes are inspected for smear-fastness according to the following ordinal scale and the highest applicable ranking applied:

5=no indication of smear is evident when tested at 10 seconds;
4=no indication of smear is evident when tested at 10 minute;
3=no indication of smear is evident when tested at 1 hour; and
2=if smear is evident when tested at 1 hour (or longer).
1=smearing is severe at 1 hour (or longer).

To determine water-fastness, a pattern consisting of five 4 mm-wide parallel stripes spaced 7 mm apart is printed at 720 dpi. Holding the paper at an incline of about 45 degrees, two drops of water—one on top of the other—are allowed to drip across the five printed stripes. This process is carried out on different parts of the test pattern at 10 sec, 10 minutes and one hour after printing. The stripes are inspected water-fastness according to the following ordinal scale and the highest applicable ranking applied:

5=no indication of running is evident when tested at 10 seconds;
4=no indication of running is evident when tested at 10 minutes;
3=no indication of running is evident when tested at 1 hour; and
2=If running is evident when tested at 1 hour (or longer).
1=running is severe when tested at 1 hour (or longer).

Inks without binder generally have a smear rating of 2 or lower. With the inventive polyurethane dispersion binders, the smear value improves to at least 3, and frequently to at least 4. This represents substantial and very noticeable improvement in smear resistance.

Another test for smear resistance consisted of determining the by printing a pattern consisting of five 4-mm wide parallel stripes spaced 7 mmm apart is printed using 720 dpi (or high quality mode) either on Hammermill Copy Plus or Xerox 4200 papers. Either one stroke or two strokes on top of each other are drawn across the five lines. Different commercially available highlighters are used for this test. The process is carried out at different times after printing the pattern. Results are reported as a function of time at 10 minutes, 1 hr and 24 hr respectively. Also the smear results can be reported as an average result after testing samples at 20 minutes, 1 hour and 24 hours after printing. In general ratings are as follows "P" (Poor) or 0–1-Strong evidence of smear-"F" (Fair) or 2–3 minimun evidence of smear-"G" or 4–5 no evidence of smear.

Print quality is determined by printing a test pattern and observing the test pattern so printed. A pattern consisting squares (10 mm×10 mm) are printed using 720 dpi either on Hammermill Copy Plus or Xerox 4200 papers. The printed squares are inspected with magnifying glasses for "white lines". Typically, the presence of white lines suggests nozzle clogging and/or misalignment. Samples are rated as follows. "P" (Poor) or 0–1—Large number of "white lines" present—"F" (Fair) or 2–3—Few "white lines" present—"G" or 4–5 No "white lines" present. A rating of fail is about the same as Poor and an OK rating is equivalent to Good. If the printer used does not have a 720 dpi setting, the "high quality" setting is used.

For inks without binder, water-fastness tends to be somewhat variable between different brands of plain paper. The polyurethane binders of the instant invention compensate for any lack of water-fastness such that the inventive inks routinely give good waterfastness regardless of paper used.

Inks of the instant invention can achieve the beneficial image properties of high OD, water and smear resistance, in a formulation of relatively low viscosity, e.g. less than about 5 mPa·s (Brookfield viscometer with a LVT adapter at 20° C.), although no particular limitation on viscosity is implied.

The polyurethanes are characterized by several techniques. Thermogravimetric analysis provides $T_g$ characterization. For the polyurethanes dispersions used in the examples, the thermogravimetric analysis was performed on a TA Instruments Model TA2920 (New Castle, Del.) at the following conditions. 1: Equilibrate at −100.00° C. 2: Modulate +/−1.00° C. every 60 seconds. 3: Isothermal for 5.00 min. 4: Ramp 3.00° C./min to 110.00° C.

The molecular weights of the polyurethane dispersions are measured by size exclusion chromatography. A solution of polymer in tetrahydrofuran (THF) is injected into a series of columns that contain packings of porous material of a certain pore size. The solute and solvent molecules diffuse through the pores where the polymer is fractionated based on molecular size. The resulting data is then compared to polystyrene standards of known molecular weights and calculated using elution volume information.

The particle size for both the pigments and the polyurethane dispersions are determined by dynamic light scattering. For the examples, a Microtrac UPA 150 analyzer from Honeywell was used. The technique is based on the relationship between the velocity distribution of the particles and the particle size. Laser generated light is scattered from each particle and is Doppler shifted by the particle Brownian motion. The frequency difference between the shifted light and the un-shifted light is amplified, digitalized and analyzed to recover the particle size distribution.

Inks of the instant invention generally are storage stable. Thus, the instant inks can sustain elevated temperature in a closed container for extended periods (e.g. 70° C. for 7 days) without substantial increase in viscosity or particle size.

The benefits of the present invention are realized without any special post-treatment after printing. No "fixation" step is required such as heat or UV curing or treatment with a reaction solution, although such operations might be useful for other reasons and no particular limitations are implied.

EXAMPLES

In these examples, the following components were utilized:

| COMPONENT | |
|---|---|
| SDP black | Manufactured in accordance with previously incorporated reference WO 01/94476 |
| Hybridur ® 580 | Polyurethane dispersion commercially available from Air Products and Chemicals |
| Mace 85-302-1 | Polyurethane dispersion commercially available from Mace Adhesives and Coatings |
| Cydrothane ® HP5035 | Polyurethane dispersion commercially available from Cytec Industries Inc. |
| SAA 100, 101 and 103 | Styrene allyl alcohol oligomers available from Lyondell Chemical |
| 58/20/10/12 | Block copolymer (see synthetic description below) |
| Vancryl ® 965 | Styrene Acrylic copolymer commercially available from Air Products |
| RP2 | Styrene Acrylic copolymer commercially available from Ciba |
| Proxel | Anti-bacterial/anti-fungal from Avecia |
| Surfonyl 104E, 465, 485 and TG | Ethoxylated nonionic surfactant from Air Products |
| BYK 348 | Surfactant commercially available from BYK Chemie |
| CD 6026 | Black Pigment commercially available from Columbia Carbon |
| Pigment 160 | Black Pigment commercially available from Degussa |
| NIPEX 180 | Black Pigment commercially available from Degussa |

Other common chemicals were obtained from Aldrich or equivalent chemical supply source.

Synthesis of Polyurethane Dispersions and other Binders

The polyurethane dispersions used in these Examples were either commercially available dispersions or synthesized by common polyurethane techniques. The commercially available polyurethane dispersions are listed in the examples that follow. Those polyurethane dispersions that were synthesized for these examples are described below and labeled PU1 to PU10. Two binders based on acrylates and/or methacrylates were made and tested for comparison purposes, and were used in Comparative Examples D and G.

Polyurethane Dispersion (PU 1) Polyester Diol Plus DAA Added

The polymer was synthesized using a one step addition reaction. 1-methyl-2-pyrrolidinone (NMP) (141 g), acetone (165 g) and dimethylol propionic acid (DMPA, 30.6 g) were added to the reactor and the mixture was heated to 65° C. and held until all DMPA dissolved. Polyester diol (adipic acid/hexane diol/isophthalic acid) (559.4 g) was added and the ingredients were mixed until a homogeneous mixture was formed. Isophorone diisocyanate (IPDI, 210.1 g) was added from an addition funnel over 15 min followed by a rinse of NMP (42.9 g). The temperature was allowed to rise to 75° C. and kept there until the reaction between the isocyanate and hydroxyl groups was completed. The NCO excess in the prepolymer was determined by titration. The reaction mixture was cooled to 30° C. and a 50% 1-dimethylamino-2-propanol (DMAP) (42.5 g) in water solution (1258 g) was added followed by the addition of a low MW styrene/allyl alcohol polymer (Lyondel SAA101) (199.9 g) in Dowanol DPM (372 g). Inversion was done by adding DI water at room temperature over 15 minutes. Immediately after the water addition, a 6.25% ethylene diamine (EDA) solution in water (314 g) was added over 5 min for chain extension. In the end, acetone was vacuum distilled.

The obtained dispersion had a measured acid value of 21.4, solids 32% and an average particle size between 200 and 400 nm.

Polyurethane Dispersion (PU 2) Polycarbonate Polyester Diol

The polyurethane was synthesized using a two-step addition reaction. The polycarbonate/polyester diol (Desmophen VPLS 2391, Bayer Chemical Corporation) was added to the reactor along with acetone and dibutyltin dilaurate (DBTL) catalyst and the mixture was heated to 40° C. A feed of IPDI was added over 60 minutes, followed by an acetone rinse. During the reaction, temperature was maintained below 52° C. The NCO value of the prepolymer was determined by titration. Thirty minutes after the IPDI feed was done, DMPA, triethyl amine (TEA) and acetone rinse (10.3 g) were added and allowed to react with the isocyanate excess. The reaction was completed in approximately 60 min (NCO titration). 1364.7 g DI water was added over 10 minutes for the phase inversion. This was immediately followed by the addition of a 6.25% solution of EDA in water (chain extender) and a water rinse (34.5 g). The dispersion was stirred at 50° C. for another 2 hrs. Acetone was vacuum distilled in order to obtain a 40% solids dispersions. The important synthetic parameters are listed in Table 8.

The obtained dispersions has a measured acid value of 21.4, and an average particle size of 120–160 nm Polyurethane Dispersion (PU 3) Polycarbonate Polyester Diol This polyurethane synthesis was similar to PU2 except the important synthetic parameters were slightly different as is shown in Table 8. Final properties are also shown in Table 8. Measured acid value is 20.6.

Polyurethane Dispersion (PU 4) Polycarbonate Polyester Diol

This polyurethane synthesis was similar to PU2 except the important synthetic parameters were slightly different as is shown in Table 8. Final properties are also shown in Table 8. Measured acid value is 31.55.

Polyurethane Dispersion (PU 5) Polyurethane Made via "High Temperature Process"

The polymer was synthesized using a one step addition reaction. NMP (202.2 g) and DMPA (25.8 g) were added to the reactor and the mixture was heated to 65° C. and held until all DMPA dissolved. Polyester diol (Stepanpol PD100LV, 462.3 g) and TEA (0.18 g) were added and the ingredients were mixed until a homogeneous mixture was formed. IPDI (188.7 g) was added from an addition funnel over 15 min followed by a rinse of NMP (27.7 g). The temperature was allowed to rise to 75 C and kept there until the reaction between the isocyanate and hydroxyl groups was completed. The NCO excess in the prepolymer was determined by titration. The reaction mixture was cooled to 32 C and 35.7 g of a 50% DMAP in water solution (neutralizing agent) was added followed by a water rinse (37.5 g). Inversion was done by adding DI water at room temperature (858.3 g) over 15 minutes. Half way into the water feed, a 6.25% ethylene diamine solution in water (chain extender, 133.8 g) was added over 5 min followed by a water rinse (37.4 g).

The dispersion was stirred at room temperature for an hour and at 40° C. for another 2 hrs.

The obtained dispersion has a measured acid value of 21.4, neutralization degree of 90%, chain extension degree of 82% and a 34.11% solids. Mn=6100, Mw=26700 (by GPC), and an average particle size of 115 nm.

Polyurethane Dispersion (PU 6) Polyester Diol Plus DM Added

This polyurethane was synthesized similar to PU1 except the SM used was SM 100. The measured acid number was 20.3.

Polyurethane Dispersion (PU 7) Polyester Diol Plus DAA Added

This polyurethane was synthesized similar to PU1 except the SM used was SM 103. The measured acid number was 30.63.

Polyurethane Dispersion (PU 8) Polyester with Ethylene Glycol

The polymer was synthesized using a one step addition reaction. NMP (354.5 g) and DMPA (40.6 g) were added to the reactor and the mixture was heated to 65° C. and held until all DMPA dissolved. Polyester diol (adipic acid/hexane diol/isophtalic acid, 502.0 g) and ethylene glycol (55.7 g) were added to the pot and the ingredients were mixed until a homogeneous mixture was formed. IPDI (465.3 g) was added from an addition funnel over 15 min. The temperature was allowed to rise to 75° C. and kept there until the reaction between the isocyanate and hydroxyl groups was completed. The NCO excess in the prepolymer was determined by titration. The reaction mixture was cooled to 32° C. and 71.5 g of a 50% DMAP in water solution (neutralizing agent) was added. Inversion was done by adding DI water at room temperature (1296.3 g) over 15 minutes. The viscous mixture was diluted by adding an additional amount of water (200.0. g) and 150 mL acetone. A 6.25% ethylene diamine solution in water (312.2 g) was added over 5 min for chain extension.

The dispersion was stirred at room temperature for an hour and in the end, acetone was vacuum distilled. The obtained dispersion had a measured acid value of 21.4, solids 31.68%, and an average particle size of 63 nm.

Polyurethane Dispersion (PU 9)

To a dry, alkali- and acid-free flask, equipped with an addition funnel, a condenser, stirrer and a nitrogen gas line was added 439.90 g Desmophene C 200 (Bayer), 88.20 g acetone and 0.06 g DBTL. The contents were heated to 40° C. and mixed well. 146.60 g IPDI was then added to the flask via the addition funnel at 40° C. over 60 min, with any residual IPDI being rinsed from the addition funnel into the flask with 21.80 g acetone.

The flask temperature was raised to 50° C., held for 30 minutes then cooled to 30° C. 60.60 g of aminopropyltriehoxysilane (APTES), followed by 22.20 g DMPA, then followed by 17.76 g TEA, was added to the flask via the addition funnel, which was then rinsed with 8.34 g acetone. The flask temperature was then raised again to 50° C. and held for 60 minutes.

With the temperature at 50° C., 1044.80 g deionized (DI) water was added over 10 minutes, followed by 44.00 g EDA (as a 15% solution in water) over 5 minutes, via the addition funnel, which was then rinsed with 107.53 g water. The mixture was held at 50° C. for 1 hr, then cooled to room temperature.

Acetone (−118.34 g) was removed under vacuum, leaving a final dispersion of polyurethane with about 35.5% solids by weight.

Polyurethane Dispersion (PU 10)

To a dry, alkali- and acid-free flask, equipped with an addition funnel, a condenser, stirrer and a nitrogen gas line was added 137.42 g isophorone diamine (IPDA), 203.62 g acetone and 33.08 g DMPA. The contents were heated to 60–65° C. for 6 hours with mixing.

619.81 g Polyester Diol 1 and 24.26 g IPDI were then added to the flask, with heating and mixing continued until the NCO number was less than 0.3%. The contents were then cooled to 50° C., and 12.36 g DMEA and 3.90 g IPDI were added to the flask and the contents mixed for another 30 minutes. 1205.55 g DI water was then added over 10 minutes to invert the polymer.

Acetone (−203.00 g) was removed under vacuum, and the temperature of the flask was allowed to rise to 75–80° C. The solids were checked and adjusted to 40.0% with DI water.

Additional properties of the polyurethane dispersions are provided in the table below.

TABLE

Polyurethane Dispersions: Physical Properties

| | Tg, ° C. | Mw | acid number, mg KOH/g of polyurethane solids | Particle Size, 50%, microns |
|---|---|---|---|---|
| Commercial polyurethane dispersions | | | | |
| Mace 85-302-01 | −46 | 6600 | 20 | 0.3 |
| Cydrothane ® HP5035 | −70 | 128000 | | |
| Hybridur ® 580 | −32 | 70000 | | |
| Polyurethane Dispersions Described in this Application | | | | |
| PU1 | | | 21.4 | 0.4 |
| PU2 | | | 21.4 | 0.14 |
| PU3 | | | 20.6 | 0.14 |
| PU4 | | | 31.55 | 0.068 |
| PU5 | | 26700 | 21.4 | 0.115 |
| PU6 | | | 20.3 | 0.241 |
| PU7 | | | 30.63 | 0.302 |
| PU8 | | | 21.4 | 0.063 |

Acrylic Binder, Comparative Example D

The acrylic/methacrylic binder denoted as 58/20/10/2 consists of 58 wt % benzyl methacrylate (BZMA), 20 wt % 2-hydroxyethylmethacrylate (HEMA), 10 wt % ethyltriethyleneglycolmethacrylate (ETEGMA) and 12 wt % methacrylic acid (MAA) used for both mixtures and comparative tests was prepared by the following procedure.

A 3-liter flask was equipped with a mechanical stirrer, thermocouple, $N^2$ inlet, condenser and two drop funnels. Isopropyl alcohol (390 g), BMA (10 g), HEMA (3 g) and MAA (3 g) were added into a pot. The pot was inerted with nitrogen, heated to reflux and held for 20 minutes before starting feeds. Feed I (BMA (410 g), HEMA (141 g), ETEGMA (72 g) and MM (72 g)) and Feed II (methylethyl ketone (400 g), 2,2 azobis-(2,4-dimethyl valeronitrile) (13.1 g) and bis(borondifluorodiphenylglyoximato)cobaltate (II) (0.075 g) were started at time 0 minutes. Feed I was added over 240 minutes. Feed II was added over 300 minutes. After 240 minutes Feed III (MM (9.2 g) and isopropyl alcohol (10 g)) was added to the pot over 10 minutes. At the completion of Feed II, the reaction was held at reflux for a further 60 minutes. Next 220 g were distilled and 450 g of 2-pyrrolidinone were added to the pot. 475 g were further distilled from the pot and another 400 g of 2-pyrrolidinone were added and the pot allowed to cool. This synthesis produced a random acrylic polymer of 58 wt % BZMA, 20 wt % HEMA, 10 wt % ETEGMA and 12 wt % MM, at a number average molecular weight of 5000. The final solution contained 42% polymer solids in 2-pyrrolidinone.

Acrylic Binder Comparative Example G

Acrylic binder that has 64/30/6 BZMA/HEMA/MM. A 3-liter flask was equipped with a mechanical stirrer, thermocouple, $N^2$ inlet, condenser, drop funnel and syringe pump. Tetrahydrofuran (950 g) and 1, 1-bis(trimethylsiloxy)-2-methyl propene (46.4 g) were added into pot. The pot was brought to reflux and 0.8 g of tetrabutylammonium m-chlorobenzoate was injected into the pot. Feed I (tetrahydrofuran, 10 g and tetrabutylammonium m-chlorobenzoate, 0.8 g) and Feed II (BZMA (640 g), 2-(trimethylsiloxy) ethylmethacrylate (466 g) and trimethylsilylmethacrylate, 79 g) were started at time 0 minutes. Feed I was added over 200 minutes. Feed II was added over 60 minutes. After 360 minutes 91 g of methanol was added to the pot. The pot was heated to reflux and 415 g were distilled. A solution of water (124 g) and dichloroacetic acid (0.2 g) were added to the pot and refluxed for 60 minutes. After refluxing, 316 g were distilled and 2-pyrrolidinone (501 g) were added. Next, a further 513 g were distilled and 401 g of 2-pyrrolidinone added. This synthesis produced a random acrylic polymer of 66 wt % BZMA, 30 wt % HEMA and 6 wt % MM, at a number average molecular weight of 5000. The final solution contained 49% polymer solids in 2-pyrrolidinone.

Example 1

Inks were made according to the following recipes (Table 1). Amounts are in weight percent of the final ink; binders are quoted on a polyurethane solids basis.

TABLE 1

|  | Inventive Example 1 | Comparative Example A |
|---|---|---|
| SDP black | 6.5 | 6.5 |
| Hybridur ® 580 | 0.1 | 0 |
| Mace 85-302-1 | 1.5 | 0 |
| Glycerol | 9.5 | 9.5 |
| Ethyleneglycol | 6 | 6 |
| Surfynol 465 | 0.8 | 0.8 |
| Water | Balance | Balance |
| TOTAL | 100 | 100 |

To a slurry of black SDP in deionized water was added, in order, the polyurethane dispersion binders (Hybridur® 580 and Mace 85-302-1), glycerol, ethylene glycol and Surfynol 465 surfactant. After mixing for 10–20 minutes, the pH was adjusted with triethanolamine to a final value of 8. The ink was then filtered through a 5 micron filter and degassed.

Patterns were printed and smear, water-fastness and optical density were determined as previously described. The highlighters used for the smear resistance tests are of different pH. HI-Liter #0774x has an acidic pH and HI-Liter #240xx has an alkaline pH. Results are as follows (Table 2).

TABLE 2

|  | Inventive Example 1 | | Comparative Example A | |
|---|---|---|---|---|
| Paper | Hammermill Copy Plus | Xerox 4024 | Hammermill Copy Plus | Xerox 4024 |
| Smear-fastness (HI-Liter #0774x) | 3.5 | 3.5 | 1 | 1 |
| Smear-fastness (HI-Liter #240xx) | 4.0 | 4.0 | 1 | 1 |
| Water-fastness | 4 | 4 | 4 | 3 |
| Optical Density | 1.4 | 1.32 | 1.4 | 1.35 |

Examples 2–5

Inks were made according to the following recipes (Table 3). Amounts are in weight percent of the final ink; binders are quoted on a solids basis. The binders listed were either available commercially or in the case of PU1 were prepared by the method described above. Binder 58/20/10/2 consists of 58% BZMA, 20% HEMA, 10% ETEGMA and 2% MMA.

TABLE 3

|  | EX 2 | EX 3 | EX 4 | EX 5 | CEX C | CEX D | CEX E | CEX F |
|---|---|---|---|---|---|---|---|---|
| SDP black | 4 | 4 | 4 | 4 | 4 | 4 | 4 | 4 |
| 58/20/10/12 | 0.5 | 0.5 | 0.5 | 0.5 | — | 1 | 0.5 | 0.5 |
| RP2 | — | — | — | — | — | — | — | 0.5 |
| Vancryl ® 965 | — | — | — | — | — | — | 0.5 | — |
| Hybridur ® 580 | — | 0.5 | — | — | — | — | — | — |
| Mace 85-302-1 | 0.5 | — | — | — | — | — | — | — |
| Cydrothane ® HP5035 | — | — | 0.5 | — | — | — | — | — |
| PU1 | — | — | — | 0.5 | — | — | — | — |
| Glycerol | 3 | 3 | 3 | 3 | 3 | 3 | 3 | 3 |
| Ethylene glycol | 4 | 4 | 4 | 4 | 4 | 4 | 4 | 4 |
| Surfynol 485 | 1 | 1 | 1 | 1 | 1 | 1 | 1 | 1 |
| Water | Balance | Balance | Balance | Balance | Balance | Balance | Balance | Balance |

TABLE 3-continued

|  | EX 2 | EX 3 | EX 4 | EX 5 | CEX C | CEX D | CEX E | CEX F |
|---|---|---|---|---|---|---|---|---|
| TOTAL | 100 | 100 | 100 | 100 | 100 | 100 | 100 | 100 |
| Viscosity (mPa · s) | 1.78 | 1.78 | 1.84 | 1.78 | 1.82 | 1.94 | 1.86 | 1.76 |
| Sur. Tens. (mN/m) | 41.61 | 40.98 | 41.29 | 40.35 | 50.44 | 41.42 | 64.73 | 40.23 |

To a slurry of black SDP in deionized water was added, in order, the binder(s), glycerol, ethylene glycol and Surfynol 485 surfactant. After mixing for 10–20 minutes, the pH was adjusted with triethanolamine to a final value of 8. The ink was then filtered through a 5 micron filter and degassed.

Comparative Example B was run using a commercial black ink supplied with the Canon 750 printer.

The inks were evaluated by printing onto plain paper (Hammermill Copy Plus and Xerox 4200) with a Canon 750 commercial printer set for: high quality. The printed pattern consisting of five 4-mm wide parallel stripes spaced 7 mm apart.

Smear was determined as described above, using the times and pens as set forth below (Table 4).

The stripes were inspected for smear-fastness according to the following scale:

G=no smear observed

F=minimum evidence of smear and

P=strong evidence of smear.

The results are presented in Table 5 (Hammermill Copy Plus paper) and Table 6 (Xerox 4200) below.

TABLE 4

|  | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|
| Pen | Z1 | Z1 | Z1 | Z2 | Z2 | Z2 | P3 | P3 | P3 | P4 | P4 | P4 | E | E | E |
| Time | 10 min | 1 hr | 24 hr | 10 min | 1 hr | 24 hr | 10 min | 1 hr | 24 hr | 10 min | 1 hr | 24 hr | 10 min | 1 hr | 24 hr |

Z1 = Zebra #1
Z2 = Zebra #2
P3 = Pilot #3
P4 = Pilot #3
E = Ecowriter

TABLE 5

Hammermill Copy Plus Paper

|  | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|
| CEXB | P | P | F | P | P | F | P | P | P | P | P | F | P | P | F |
| CEXC | P | P | G | F | F | F | P | P | P | P | P | F | P | P | F |
| CEXD | P | P | P | P | P | P | P | P | P | P | P | P | P | P | P |
| CEXE | G | G | G | F | F | G | F | G | G | G | G | G | G | G | G |
| CEXF | P | P | F | P | P | P | P | P | P | P | P | P | P | P | P |
| EX2 | G | G | G | G | G | G | G | G | G | G | G | G | G | G | G |
| EX3 | F | F | G | F | G | G | G | G | G | G | G | G | F | F | G |
| EX4 | F | G | G | F | F | G | F | F | G | F | F | G | F | F | G |
| EX5 | F | F | G | F | F | G | F | F | G | G | G | G | F | F | G |

TABLE 6

Xerox 4200 Paper

|  | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|
| CEXB | P | P | F | P | P | F | P | P | P | P | P | F | P | P | F |
| CEXC | P | P | G | F | F | F | P | P | P | P | P | F | P | P | F |
| CEXD | P | P | P | P | P | P | P | P | P | P | P | P | P | P | P |
| CEXE | F | F | F | F | F | F | F | F | F | G | G | G | F | F | F |
| CEXF | P | P | F | P | P | P | P | P | P | P | P | P | P | P | P |

TABLE 6-continued

Xerox 4200 Paper

|     | X1 | X2 | X3 | X4 | X5 | X6 | X7 | X8 | X9 | X10 | X11 | X12 | X13 | X14 | X15 |
|-----|----|----|----|----|----|----|----|----|----|-----|-----|-----|-----|-----|-----|
| EX2 | F  | F  | G  | F  | G  | G  | F  | F  | F  | G   | G   | G   | G   | G   | G   |
| EX3 | F  | F  | F  | F  | F  | F  | F  | F  | F  | F   | F   | F   | F   | F   | F   |
| EX4 | F  | F  | F  | F  | F  | F  | F  | F  | F  | F   | F   | F   | F   | F   | F   |
| EX5 | F  | F  | F  | F  | F  | F  | F  | F  | F  | F   | F   | F   | F   | F   | F   |

As can be seen, inventive Examples 2 to 5 demonstrate that polyurethane binders improve smear resistance. Mixtures of polyurethane and acrylate binders are also shown to improve performance.

Examples 6–9

Inks were made according to the following recipes (Table 7). Amounts are in weight percent of the final ink; binders are quoted on a solids basis. Each of these inks had a pH of 8.

TABLE 7

|                     | EX 6    | EX 7    | EX 8    | EX 9    |
|---------------------|---------|---------|---------|---------|
| NIPEX 180           | 6.5     | 6.5     | 6.5     | 6.5     |
| Glycerol            | 8.3     | 8.3     | 8.3     | 8.3     |
| Ethylene Glycol     | 9       | 9       | 9       | 9       |
| 1,2-Hexanediol      | 7.5     | 7.5     | 7.5     | 7.5     |
| EDTA                | 3       | 3       | 3       | 3       |
| Surfonyl 485        | 1.2     | 1.2     | 1.2     | 1.2     |
| PU2                 | 2       | —       | —       | —       |
| PU3                 | —       | 2       | —       | —       |
| PU4                 | —       | —       | 2       | —       |
| MACE 85-302-1       | —       | —       | —       | 2       |
| Water               | Balance | Balance | Balance | Balance |
| TOTAL               | 100     | 100     | 100     | 100     |
| Viscosity (mPa · s) | 2.64    | 2.64    | 2.68    | 2.44    |
| Sur. Tens. (mN/m)   | 31.54   | 32.51   | 32.58   | 32.90   |
| Conductivity $10^{-3}$ | 0.619 | 0.937 | 0.701 | 0.657 |

The conductivity units are in mS (millisiemens) meter and the conductivity was measured by an Ecmeter.

TABLE 8

|       | Acid # (theor. on solids) | Neut. Degree (%) | NCO:OH Ratio | Chain Ext. Degree (%) | Polyol type | Particle Size (microns) | | | | |
|-------|---------------------------|------------------|--------------|-----------------------|-------------|------|-------|--------|--------|----------------|
|       |                           |                  |              |                       |             | Mn   | Mv    | 10%    | 50%    | % < 204.4 nm   |
| PU2   | 20                        | 75               | 5/2.9        | 80                    | PCPE        | 0.115 | 0.141 | 0.0961 | 0.1395 | 94.47 |
| PU3   | 15                        | 70               | 5/4          | 89                    | PCPE        | 0.125 | 0.146 | 0.105  | 0.144  | 95.05 |
| PU4   | 20                        | 75               | 5/4          | 75                    | PCPE        | 0.059 | 0.070 | 0.050  | 0.068  | 99.99 |
| MACE 85-302-1 | 20                |                  | 1/1          |                       |             | 0.83  | 0.302 | 0.084  | 0.30   | 25.99 |

PCPE = Polycarbonate polyester

To a slurry of NIPEX 180 that had been converted to an SDP form by methods described in Examples 1–5, deionized water was added followed by, in order, the binder(s), glycerol, ethylene glycol, 1,2-hexanediol, EDTA and Surfynol 485 surfactant. After mixing for 10–20 minutes, the pH was adjusted with triethanolamine to a final value of 8. The ink was then filtered through a 5 micron filter and degassed.

Patterns were printed and smear was determined as described in Example 2–5 using the conditions in Table 9.

TABLE 9

| Smear Test/ Example | Acid One Stroke; Average of 10 min, 1 hr, 24 hr tests | Base One Stroke; Average of 10 min, 1 hr, 24 hr tests | Acid Two Stroke; Average of 10 min, 1 hr, 24 hr tests | Base Two Stroke; Average of 10 min, 1 hr, 24 hr tests | Print Quality |
|------|---|---|---|---|------|
| Ex 6 | 2 | 4 | 2 | 2 | OK   |
| Ex 7 | 2 | 3 | 2 | 2 | Fail |
| Ex 8 | 4 | 4 | 2 | 2 | Fail |
| Ex 9 | 4 | 4 | 2 | 2 | OK   |

Example 6–9 demonstrates that smear resistance is observed with these polyurethane dispersions that are made from PCPE (polycarbonate polyester) polyols and PE/EG polyols.

Examples 10–15

Inks were made according to the following recipes (Table 10). Amounts are in weight percent of the final ink; binders are quoted on a solids basis.

TABLE 10

|                 | EX 10 | EX 11 | Ex 12 | EX 13 | Ex 14 | EX 15 |
|-----------------|-------|-------|-------|-------|-------|-------|
| Pigment 160     | 6.5   | 6.5   | 6.5   | 6.5   | 6.5   | 6.5   |
| Glycerol        | 9.0   | 9.0   | 9.0   | 9.0   | 9.0   | 9.0   |
| Ethylene Glycol | 6     | 6     | 6     | 6     | 6     | 6     |
| 1,2-Hexanediol  | 2     | 2     | 2     | 2     | 2     | 2     |

TABLE 10-continued

|            | EX 10 | EX 11 | Ex 12 | EX 13 | Ex 14 | EX 15 |
|------------|-------|-------|-------|-------|-------|-------|
| EDTA (5%)  | 2     | 2     | 2     | 2     | 2     | 2     |
| BYK 248    | 0.2   | 0.2   | 0.2   | 0.2   | 0.2   | .2    |
| PU5        | 2     | —     | —     | —     | —     | —     |
| PU1        | —     | 2     | —     | —     | —     | —     |

TABLE 10-continued

|  | EX 10 | EX 11 | Ex 12 | EX 13 | Ex 14 | EX 15 |
|---|---|---|---|---|---|---|
| PU6 | — | — | 2 | — | — | — |
| PU7 | — | — | — | 2 | — | — |
| PU8 | — | — | — | — | 2 | — |
| MACE 85-302-1 | — | — | — | — | — | 2 |
| Water | Balance | Balance | Balance | Balance | Balance | Balance |
| TOTAL | 100 | 100 | 100 | 100 | 100 | 100 |
| Viscosity (mPa · s) | 2.7 | 2.44 | 2.52 | 2.42 | 2.56 | 2.79 |
| Surface. Tension. (mN/m) | 24.43 | 23.39 | 23.68 | 23.49 | 23.34 | 23.97 |

The polyurethanes (PU1, PU5–8 and MACE) dispersions were prepared by the methods described above. The important polyester synthetic parameters, added styrene allyl alcohol (SAA) oligomers and particle sizes are listed for these polyurethane binders in Table 11.

The inks were prepared by adding to a slurry of the Pigment 160, the binders, glycerol and other components in Table 10. After mixing for about 20 minutes, the ink was filtered through a 5 micron filter and degassed.

TABLE 11

|  | Acid # (theor. on solids) | Neut. Degree (%) | NCO:OH Ratio | Chain Ext. Degree (%) | Polyol type | Particle Size (microns) | | | | |
|---|---|---|---|---|---|---|---|---|---|---|
|  |  |  |  |  |  | Mn | Mv | 10% | 50% | % < 204.4 nm |
| PU5 | 21 |  |  |  | Note 1 | 0.115 | — | — | — | — |
| PU1 | 16 | 90 | 5.0/4.0 | 95 | PE w SAA 101 | 0.344 | 0.460 | 0.292 | 0.4 | .01 |
| PU6 | 16 | 90 | 5.0/4.0 | 95 | PE w SAA 100 | 0.202 | 0.241 | 0.173 | 0.241 | 24.3 |
| PU7 | 16 | 90 | 5.0/4.0 | 95 | PE w SAA 103 | 0.275 | 0.338 | 0.235 | 0.302 | 2.1 |
| PU8 | 16 | 7590 | 5.0/4.0 | 80 | PE/EG (0.52/1.0) | 0.038 | 0.05 | 0.031 | 0.049 | 99.99 |
| MACE 85-302-1 | 20 |  | 2.5/2.5 |  |  | 0.083 | 0.302 | 0.084 | 0.3 | 26. |

Note 1. Diol is a hindered polyester diol from Stepan Corporation, Stepanpol PD-110LV.

The smear resistance and print quality for Examples 10–15 are listed in Table 12. The tests were performed on three different papers: Hammermill Press, Xerox 4024 and Canon HR.

TABLE 12

| | Smear Resistance; tested using Sanford highlighters | | | Print Quality | | |
|---|---|---|---|---|---|---|
| | HMP | XEROX 4024 | CANON HR | HMP | XEROX 4024 | CANON HR |
| Ex 10 | 1 | 2 | 2 | 2.5 | 2.5 | 2.5 |
| Ex 11 | 1 | 2 | 1 | 2 | 2 | 2 |
| Ex 12 | 0 | 0 | 0 | 0 | 0 | 0 |
| Ex 13 | 0 | 1 | 1 | 0 | 0 | 0 |
| Ex 14 | 0 | 2 | 2 | 1 | 1 | 1 |
| Ex 15 | 2.5 | 2.8 | 2.5 | 3 | 3 | 3 |

Note:
Both acidic and basic Sanford highlighters used. The rating reported is an average of both highlighters.

Polyurethane dispersions based on different polyester with added styrene allyl alcohol oligomers perform adequately in smear tests. The polyurethane dispersion based with the styrene allyl alcohol SAA 100 performance is poor.

Examples 16–21

Inks were made according to the following recipes (Table 13). Amounts are in weight percent of the final ink: binders are quoted on a solids basis. Inks with 3 different binders were compounded with two different SDP black pigments.

TABLE 13

|  | EX 16 | EX 17 | Ex 18 | EX 19 | Ex 20 | EX 21 |
|---|---|---|---|---|---|---|
| Pigment SDP 160 | 6.5 | 6.5 | 6.5 | — | — | — |
| Pigment CD 6026 | — | — | — | 6.5 | 6.5 | 6.5 |
| Glycerol | 14.0 | 14.0 | 14.0 | 14.0 | 14.0 | 14.0 |
| Ethylene Glycol | 3 | 3 | 3 | 3 | 3 | 3 |
| 1,2-Hexanediol | 4.5 | 4.5 | 4.5 | 4.5 | 4.5 | 4.5 |
| EDTA (5%) | 3 | 3 | 3 | 3 | 3 | 3 |
| BYK 248 | 0.1 | 0.1 | 0.1 | 0.1 | 0.1 | 0.1 |
| PU9 | — | 0.86 | — | — | 0.86 | — |
| PU10 | — | — | 1.86 | — | — | 1.86 |
| MACE 85-302-1 | 1.86 | — | — | 1.86 | — | 2 |
| Water | Balance | Balance | Balance | Balance | Balance | Balance |
| TOTAL | 100 | 100 | 100 | 100 | 100 | 100 |

TABLE 13-continued

|  | EX 16 | EX 17 | Ex 18 | EX 19 | Ex 20 | EX 21 |
|---|---|---|---|---|---|---|
| Viscosity (mPa·s) | 3.02 | 2.88 | 2.9 | 2.96 | 3. | 2.88 |
| Sur. Tens. (mN/m) | 26.593 | 24.29 | 25.81 | 26.69 | 25.79 | 28.56 |

The polyurethane binders PU9 and 10 are Herbst 2799 and PUR 420. The inks were prepared by adding to a slurry of the SDP indicated in Table 13, the binders, glycerol and other components in Table 13. After mixing for about 20 minutes, the ink was filtered through a 5 micron filter and degassed.

Each of the inks (Ex 16–21) were printed as previously described and tested for smear resistance. The results are listed in Table 14.

TABLE 14

|  | Smear Resistance | |
|---|---|---|
|  | HMP | XEROX 4024 |
| Ex 16 | 4 | 4 |
| Ex 17 | 2 | 2 |
| Ex 18 | 3 | 3 |
| Ex 19 | 4 | 4 |
| Ex 20 | 2 | 3 |
| Ex 21 | 3 | 3 |

Smear resistance is demonstrated for different pigments that have been processed into an SDP form.

Examples 22–25

Inks were made according to the following recipes (Table 15). Amounts are in weight percent of the final ink; binders are quoted on a polyurethane solids basis. These examples show the change in performance when the total binder is held constant at 4% and the polyurethane binders various between 4 and 0 and an acrylic binder varies between 0 and 4. The acrylic binder synthesis is described above.

TABLE 15

|  | EX 22 | EX 23 | EX 24 | EX 25 | CEx G |
|---|---|---|---|---|---|
| Pigment 160 | 7.0 | 7.0 | 7.0 | 7.0 | 7.0 |
| Glycerol | 13.5 | 13.5 | 13.5 | 13.5 | 13.5 |
| 1,2-Hexanediol | 3.0 | 3.0 | 3.0 | 3.0 | 3.0 |
| EDTA (5%) | 1 | 1 | 1 | 1 | 1 |
| SURFYNOL TG | 1 | 1 | 1 | 1 | 1 |
| Acrylic binder 64/30/6 BZMA/HEMA/MAA | 3 | 2 | 1 | 0 | 4 |
| MACE 85-302-1 | 1 | 2 | 3 | 4 | 0 |
| Water | Balance | Balance | Balance | Balance | Balance |
| TOTAL | 100 | 100 | 100 | 100 | 100 |
| Viscosity, (mPa·s) | 3.82 | 3.48 | 3.72 | 3.46 | 3.98 |

To a slurry of Pigment 160 that had been converted to an SDP form by methods described in Examples 1–5, deionized water was added then, in order, the binder(s), and the other ingredients listed in Table 15 were added. After mixing for 10–20 minutes, the pH was adjusted with triethanolamine to a final value of 8. The ink was then filtered through a 5 micron filter and degassed.

These inks (Ex 22–25 and comparative G) were printed as described previously and tested. The results of the smear tests along with RUB and SCRATCH are shown in Table 16.

TABLE 16

|  | BINDER acrylic/polyurethane | Acid Highlighter | Base Highlighter | RUB test | SCRATCH test |
|---|---|---|---|---|---|
| Ex. 22 | 3/1 | 3.5 | 2.5 | 3 | 2.6 |
| Ex. 23 | 2/2 | 4 | 2.5 | 3 | 2.7 |
| Ex. 24 | 1/3 | 4 | 2.5 | 3 | 2.7 |
| Ex. 25 | 0/4 | 4 | 4 | 3 | 3 |
| Comp G | 4/0 | 2.5 | 2 | 1 | 2 |

Rub Test:

Printed squares (30 mm×30 mm) at 720 dpi are rubbed off 10 min, 1 hr and 24 hr after printing. Images are rubbed with a white cloth that is visually inspected. Rating is as follows "P" 0–1 significant black ink left on the cloth, "F" 2–3 minimum ink left on the cloth, "G" 4–5 no ink left on the cloth.

As in the case of the smear test results are averaged on time.

Scratch Test:

This is a qualitative test with a "finger nail". Images printed on photoglossy paper are scratched with a fingernail and the damage area visually inspected. "P" 0–1 significant damaged area, "F" 2–3 some damaged area, "G" 4–5 no damaged area.

Example 26

Inks were made according to the following recipes (Table 17). Amounts are in weight percent of the final ink; binders are quoted on a solids basis. The SDP used was a magenta pigment that was converted to its SDP form, according to examples 12 or 13 in WO 01/94476, previously incorporated by reference.

TABLE 16

|  | Comp Ex H | Ex 26 |
|---|---|---|
| Pigment | 4 | 4 |
| Mace 85-302-1 | 0 | 2 |
| 1,2-hexane diol | 4 | 4 |
| 2-P | 3 | 3 |
| Glycerol | 15.8 | 15.8 |
| Ethylene Glycol | 8 | 8 |
| Triethanol Amine | 0.7 | 0.7 |
| Surfynol 465 | 1 | 1 |
| Surfynol 104E | 0.5 | 0.5 |
| EDTA | 0.05 | 0.05 |
| Proxel GXL | 0.15 | 0.15 |
| Water | To Balance | To Balance |
| Pigment | Clariant Hostaperm Pink EWD pigment at 14.6% | |

To a slurry of the magenta pigment that had been converted to an SDP form by methods noted above, deionized water was added then, in order, the binder(s), and the other ingredients listed in Table 17 were added. After mixing for 10–20 minutes, the pH was adjusted with triethanolamine to a final value of 8. The ink was then filtered through a 5 micron filter and degassed.

These inks were used in a commercial printer and the resulting paper tested for smear resistance. The results are listed in Table 17. The smear test criteria used was scale for highlighter test: 1=smear with 1 pass, 2=high smear with 2 passes, 3=moderate smear with 2 passes, 4=slight smear with 2 passes, 5=no smear with 2 passes.

TABLE 17

| Example | Comp. Ex. H | | Ex. 26 | |
|---|---|---|---|---|
| Paper Used/ Property | Hammermill Copy + | Xerox 4024 | Hammermill Copy + | Xerox 4024 |
| Highlighter 5 min | 1 | 1 | 4 | 4 |
| Highlighter 10 min | 1 | 1 | 4 | 4 |
| Highlighter 1 hour | 3 | 3 | 4 | 4 |

Example 26 demonstrates that polyurethane dispersions can impart excellent smear resistance to colored pigments.

We claim:

1. An aqueous inkjet ink comprising a self-dispersing pigment, a polyurethane dispersion and water, wherein the polyurethane dispersion has acid groups and the acid number of the polyurethane dispersion is about 18 to 40, and wherein the ink has a surface tension in the range of about 20 mN/m to about 70 mN/m at 25° C., and a viscosity in the range of about 1 mPa·s to about 30 mPa·s at 25° C., provided that the self-dispersing pigment comprises a pigment that has been oxidatively treated on its surface with hypochlorous acid, sulfonic acid, or ozone so as to bond at least one functional group selected from the group consisting of carbonyl, carboxyl, hydroxyl and sulfone, onto the surface of the pigment, and further
wherein a combination of two or more polyurethane dispersions is used.

2. An aqueous inkjet ink comprising a self-dispersing pigment, a polyurethane dispersion and water, wherein the polyurethane dispersion has acid groups and the acid number of the polyurethane dispersion is about 18 to 40, and wherein the ink has a surface tension in the range of about 20 mN/m to about 70 mN/m at 25° C., and a viscosity in the range of about 1 mPa·s to about 30 mPa·s at 25° C., provided that the self-dispersing pigment comprises a pigment that has been oxidatively treated on its surface with hypochlorous acid, sulfonic acid, or ozone so as to bond at least one functional group selected from the group consisting of carbonyl, carboxyl, hydroxyl and sulfone, onto the surface of the pigment, and further
wherein the polyurethane of the polyurethane dispersion is based on an isocyanate-functional polyurethane prepolymer that has been chain extended wherein the isocyanate-functional polyurethane prepolymer comprises a prepolymer that has been prepared by reacting a diisocyanate with a compound containing one or more isocyanate reactive groups and at least one acid or acid salt group where the equivalents of isocyanate functionality is greater than the equivalents of isocyanate-reactive functionality.

3. The aqueous inkjet ink of claim 2, wherein the self-dispersing pigment is a self-dispersing carbon black.

4. The aqueous inkjet ink of claim 2, wherein the polyurethane dispersion is an anionically stabilized polyurethane dispersion.

5. The aqueous inkjet ink of claim 2, wherein the polyurethane dispersion has Tg of less than about −30° C.

6. The aqueous inkjet ink of claim 2, wherein the polyurethane dispersion has weight average molecular weight of more than about 30,000.

7. The aqueous ink jet ink of claim 2, comprising from about 0.01 to about 10% by weight of pigment, and the polyurethane dispersion in an amount up to about 10% by weight (polyurethane solids basis), based on the weight of the ink.

8. The aqueous inkjet ink of claim 2, wherein the self-dispersing pigment comprises a pigment that has been oxidatively treated on its surface with ozone so as to bond carboxyl groups onto the surface of the pigment.

9. An aqueous inkjet ink comprising a self-dispersing pigment, a polyurethane dispersion and water, wherein the polyurethane dispersion has acid groups and the acid number of the polyurethane dispersion is about 18 to 40 and wherein the ink has a surface tension in the range of about 20 mN/m to about 70 mN/m at 25° C., and a viscosity in the range of about 1 mPa·s to about 30 mPa·s at 25° C., provided that the polyurethane of the polyurethane dispersion has Tg of less than about −30° C., and further
wherein a combination of two or more polyurethane dispersions is used.

10. An aqueous inkjet ink comprising a self-dispersing pigment, a polyurethane dispersion and water, wherein the polyurethane dispersion has acid groups and the acid number of the polyurethane dispersion is about 18 to 40, and wherein the ink has a surface tension in the range of about 20 mN/m to about 70 mN/m at 25° C., and a viscosity in the range of about 1 mPa·s to about 30 mPa·s at 25° C., provided that the polyurethane of the polyurethane dispersion has Tg of less than about −30° C., and further
wherein the polyurethane of the polyurethane dispersion is based on an isocyanate-functional polyurethane prepolymer that has been chain extended wherein the isocyanate-functional polyurethane prepolymer comprises a prepolymer that has been prepared by reacting a diisocyanate with a compound containing one or more isocyanate reactive groups and at least one acid or acid salt group where the equivalents of isocyanate functionality is greater than the equivalents of isocyanate-reactive functionality.

11. The aqueous inkjet ink of claim 9 or 10, wherein the self-dispersing pigment is a self-dispersing carbon black.

12. The aqueous inkjet ink of claim 9 or 10, wherein the polyurethane dispersion is an anionically stabilized polyurethane dispersion.

13. The aqueous inkjet ink of claim 9 or 10, wherein the polyurethane dispersion has weight average molecular weight of more then about 30,000.

14. The aqueous ink jet ink of claim 9 or 10, comprising from about 0.01 to about 10% by weight of pigment, and the polyurethane dispersion in an amount up to about 10% by weight (polyurethane solids basis), based on the weight of the ink.

15. An aqueous inkjet ink comprising a self-dispersing pigment, a polyurethane dispersion and water, wherein the polyurethane dispersion has acid groups and the acid number of the polyurethane dispersion is about 18 to 40, and wherein the ink has a surface tension in the range of about 20 mN/m to about 70 mN/m at 25° C., and a viscosity in the range of about 1 mPa·s to about 30 mPa·s at 25° C., provided that a combination of two or more polyurethane dispersions is utilized.

16. The aqueous inkjet ink of claim 15, wherein the self-dispersing pigment is a self-dispersing carbon black.

17. The aqueous inkjet ink of claim 15, wherein at least one of the polyurethane dispersions is an anionically stabilized polyurethane dispersion.

18. The aqueous inkjet ink of claim 15, wherein at least one of the polyurethane dispersions has weight average molecular weight of more than about 30,000.

19. The aqueous inkjet ink of claim 15, wherein the polyurethane of at least one of the polyurethane dispersions is based on an isocyanate-functional polyurethane prepolymer that has been chain extended.

20. The aqueous ink jet ink of claim 15 comprising from about 0.01 to about 10% by weight of pigment, and the polyurethane dispersions in an amount up to about 10% by weight (polyurethane solids basis), based on the weight of the ink.

21. An aqueous inkjet ink comprising a self-dispersing pigment, a polyurethane dispersion and water, wherein the polyurethane dispersion has acid groups and the acid number of the polyurethane dispersion is about 18 to 40 and wherein the ink has a surface tension in the range of about 20 mN/m to about 70 mN/m at 25° C., and a viscosity in the range of about 1 mPa·s to about 30 mPa·s at 25° C., provided that the polyurethane of the polyurethane dispersion is based on an isocyanate-functional polyurethane prepolymer comprises a prepolymer that has been prepared by reacting a diisocyanate with a compound containing one or more isocyanate reactive groups and at least one acid or acid salt group where the equivalents of isocyanate functionality is greater than the equivalents of isocyanate-reactive functionality.

22. A process for inkjet printing comprising the step of jetting an ink onto a substrate, wherein the ink is the aqueous inkjet ink of claims 1, 2, 15 or 21.

23. The process of claim 22, wherein the substrate is plain paper.

24. The process of claim 22, wherein the self-dispersing pigment is a self-dispersing carbon black.

25. The process of claim 22, wherein the polyurethane dispersion is an anionically stabilized polyurethane dispersion.

26. The process of claim 22, wherein the ink comprises from about 0.01 to about 10% by weight of pigment, and the polyurethane dispersion in an amount up to about 10% by weight (polyurethane solids basis), based on the weight of the ink.

27. The process of claim 22, wherein the polyurethane dispersion has a weight average molecular weight of more than about 30,000.

28. The aqueous inkjet ink of claim 21, wherein the self-dispersing pigment is a self-dispersing carbon black.

29. The aqueous inkjet ink of claim 21, wherein the polyurethane dispersion is an anionically stabilized polyurethane dispersion.

30. The aqueous inkjet ink of claim 21, wherein the polyurethane dispersion has weight average molecular weight of more than about 30,000.

31. The aqueous ink jet ink of claim 21, comprising from about 0.01 to about 10% by weight of pigment, and the polyurethane dispersion in an amount up to about 10% by weight (polyurethane solids basis), based on the weight of the ink.

* * * * *

UNITED STATES PATENT AND TRADEMARK OFFICE
CERTIFICATE OF CORRECTION

PATENT NO. : 7,176,248 B2  Page 1 of 1
APPLICATION NO. : 10/346041
DATED : February 13, 2007
INVENTOR(S) : Valentini Jose Esteban et al.

It is certified that error appears in the above-identified patent and that said Letters Patent is hereby corrected as shown below:

Col. 13 line 49, in the table appearing with the label "Block copolymer" for 58/20/10/12 should be changed to --Random Acrylic Polymer--

Signed and Sealed this

Twenty-second Day of June, 2010

David J. Kappos
*Director of the United States Patent and Trademark Office*